United States Patent [19]

Bernard et al.

[11] 4,369,368

[45] Jan. 18, 1983

[54] LEVEL MEASURING DEVICE

[75] Inventors: Patrice Bernard; Jacques Bouchard, both of Aix en Provence, France

[73] Assignee: Commissariat a l'Energie Atomique, Paris, France

[21] Appl. No.: 180,886

[22] Filed: Aug. 25, 1980

[30] Foreign Application Priority Data

Sep. 5, 1979 [FR] France .................................. 79 22218

[51] Int. Cl.$^3$ .............................................. G01F 23/00
[52] U.S. Cl. .................................................. 250/357.1
[58] Field of Search ............... 250/252, 308, 357, 390, 250/432

[56] References Cited

U.S. PATENT DOCUMENTS 3,100,841  8/1963  Reider .................................. 250/385
3,745,338  7/1973  Joyce .................................. 250/357

Primary Examiner—Alfred E. Smith
Assistant Examiner—Janice A. Howell
Attorney, Agent, or Firm—Kerkam, Stowell, Kondracki & Clarke

[57] ABSTRACT

Device for measuring the surface level of a liquid in a vertically axed enclosure containing a radioactive fluid, the enclosure wall being able to receive deposits of radioactive corrosion products, which comprises N radiation sources located on the same vertical line in the vicinity of the enclosure wall, said sources being able to emit radiation traversing the enclosure; N' radiation detectors $D_i(N'>N)$ located successively at levels on a second vertical line contained in the plane defined by the first vertical line and said axis, said detectors being able to detect the radiation which has traversed the enclosure, each detector measuring the intensity of the radiation received; and means for processing said measurements and deducing therefrom the liquid surface level and/or the local density of the two-phase mixture, wherein it also comprises at least one supplementary detector positioned outside the area reached by the radiation emitter by the sources, said detector being able to measure the radiation due to the radioactivity of the fluid and said deposits.

2 Claims, 6 Drawing Figures

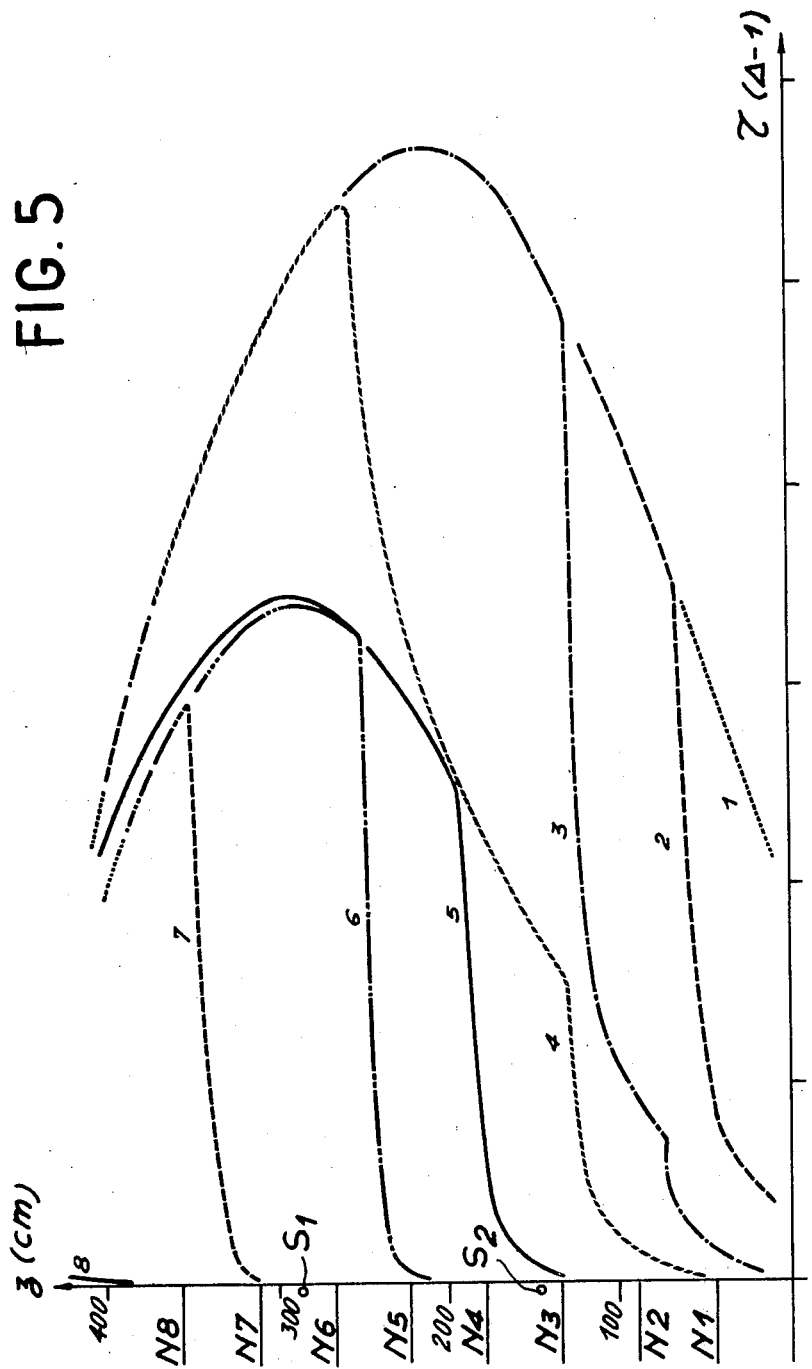

LEVEL MEASURING DEVICE

BACKGROUND OF THE INVENTION

The present invention relates to a device for measuring the level of a liquid in a radioactive enclosure.

It is known to measure the level of a liquid or solid substance within an enclosure by means of one or more radioactive source vertically positioned outside the enclosure at different levels, as well as detectors located on the opposite wall of the enclosure which receives the radiation coming from the said sources. The absorption level of the radiation emitted by these sources has an attenuation level which varies with the traversed material. The level of the substance in the enclosure is deduced from the intensity of the radiation measured by the detectors positioned along the enclosure wall.

U.S. Pat. No. 3,100,841 describes a device for measuring the level of the charge in a blast furnace and which operates according to this principle. It has a series of level indicators, each of which is constituted by a radioactive source, a detector and a pilot light. The radioactive sources are arranged along a vertical line on the blast furnace. The detectors are located along a vertical line diametrically opposite to the first line. Each radioactive source is located at the bottom of a cylindrical collimating well. The detector, constituted by a G-M counter, is also located on the bottom of a cylindrical well in such a way that the sensitive part of the counter or tube is exposed to the radiation of the diametrically opposite source. Each detector is only sensitive to the radiation coming from the source associated therewith as a result of a collimating device. Means are provided for recording a reading when the detected radiation level exceeds a given level. The charge level in the blast furnace is calculated therefrom.

However, a measuring device as described hereinbefore is not suitable for measuring the level of a liquid contained in a radioactive enclosure. Thus, the activity of this liquid swamps the radioactivity coming from radioactive sources, making it impossible to measure the level of said liquid.

BRIEF SUMMARY OF THE INVENTION

The invention relates to a device for measuring the level of a liquid contained in a radioactive enclosure and which makes it possible to perform such a measurement. It applies more particularly, but not exclusively, to the measurement of the water level in the pressurizer of a pressurized water reactor (PWR).

It is known that in PWR reactors, the pressure in the primary circuit (and therefore in the reactor vessel) is maintained at a value of approximately 155 bars by a pressurizer, which is constituted by a sealed enclosure in which the primary circuit pressure is maintained by equilibrium between the liquid phase and the gaseous phase of the water. As a depressurization incident is particularly serious, it is of particular interest to control the operation of this pressurizer and consequently the level of the liquid phase therein.

The measurement of the liquid level in the pressurizer by means of the device described hereinbefore makes it possible to provide a complementary, redundant information, which is particularly useful in certain reactor operating conditions (large amplitude transient conditions, incident, etc). This device makes it possible to calibrate and complete existing measurements by pressure difference which sometimes cause representativity problem (drift, hysteresis, readjustment, inability to detect possible two-phase situations).

N collimated radiation emitters, whose beam is substantially directed in accordance with the diameters of the enclosure are positioned along a first generating line of the latter, whilst detectors for collecting the radiation which has traversed the enclosure containing the liquid-gas mixture, are positioned along a generating line which is diametrically opposite to the first line. In this way, the attenuation of the radiation is measured and by indentifying the axial "chart" of the counting rates of the detectors, it is possible to measure the liquid level position. Moreover, as the device has been calibrated during its installation (initial measurement: empty enclosure, then with different water levels) it is possible to estimate by a number of vertical readings the average water density along the radiation path.

To permit the measurement of radiation coming from the radiation sources, the device according to the invention has at least one detector positioned in such a way that it is never exposed to the radiation emitted by the sources. Thus, within the total counting rate, it is possible to correct the part which is due to the activity of the water.

More specifically, the invention relates to a device for measuring the surface level of a liquid in a vertically axed enclosure containing a radioactive fluid, the enclosure wall being able to receive deposits of radioactive corrosion products, which comprises N radiation sources located on the same vertical line in the vicinity of the enclosure wall, said sources being able to emit radiation traversing the enclosure; N' radiation detectors $D_i$ ($N' > N$) located successively at levels on a second vertical line contained in the plane defined by the first vertical line and said axis, said detectors being able to detect the radiation which has traversed the enclosure, each detector measuring the intensity of the radiation received; and means for processing said measurements and deducing therefrom the liquid surface level and/or the local density of the two-phase mixture, wherein it also comprises at least one supplementary detector positioned outside the area reached by the radiation emitted by the sources, said detector being able to measure the radiation due to the radioactivity of the fluid and said deposits.

This measurement not only makes it possible to determine an equilibrium level between the vapour and the liquid, e.g. water, but also is able to give a picture of the two-phase equilibrium zones between the vapour and the liquid and an estimate of the corresponding density. They consist on the one hand of essentially liquid zones in which there are vapour bubbles and on the other hand of essentially vapour zones in which there are water droplets.

Preferably, the detector according to the invention comprises between the enclosure wall and each of the detectors a collimating device for the radiation which has traversed the enclosure and which is constituted by a system of parallel metal plates, whose function is to reduce the contribution of stray radiation in the vicinity of the detectors to the counting rate of the emitters.

Preferably, the number of N radiation sources is well below the number N' of radiation detectors.

BRIEF DESCRIPTION OF THE DRAWINGS

The invention is described greater in detail hereinafter relative to non-limitative embodiments and with reference to the attached drawings, wherein show:

FIGS. 4 and 5 diagrams illustrating a level detection method using gamma radiation sources and detectors.

DETAILED DESCRIPTION OF THE PREFERRED EMBODIMENTS

Figure 1:
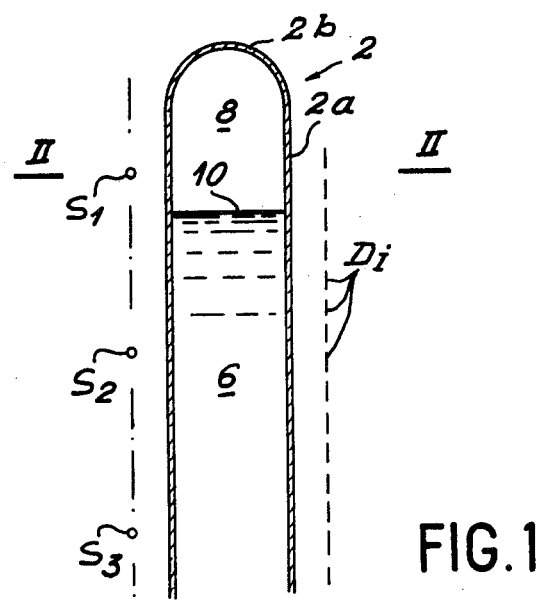
FIG. 1 a vertical sectional view of a pressurizer showing the installation of the radiation sources and radiation detectors.

FIG. 1 shows a device according to the invention. FIG. 1 shows in axial vertical section the pressurizer 2 constituted by a cylindrical sidewall 2a sealed by an upper base 2b. This enclosure contains a liquid phase 6 in equilibrium with a vapour phase 8. The horizontal line 10 indicates the interface between these two media. Obviously, the separation between them cannot be so precise.

In order to detect the level, radiation sources $S_1$, $S_2$ and $S_3$ are positioned along a straight line parallel to a generating line of sidewall 2a. A plurality of radiation detectors $D_i$ is positioned in accordance with a straight line parallel to a generating line of the sidewall 2a of the pressurizer and contained in the same axial plane as the first generating line. These detectors partly or totally cover the axial height of the pressurizer.

Figure 2:
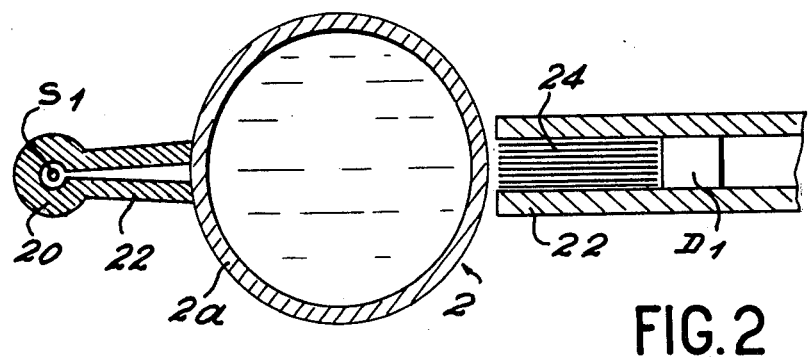
FIG. 2 a cross-sectional view showing in greater detail an embodiment in which the radiation is $\gamma$ radiation.

FIG. 2 shows in greater detail a part of this installation in the case where the radiation source is a $\gamma$ source. There is once again sidewall or envelope 2a of pressurizer 2. For example, the internal diameter of the pressurizer is 213.4 cm and the wall thickness is 10.8 cm. Source $S_1$, which is for example a 1000 curie cobalt 60 source is located in a shield 20, which is extended by a shield 22 towards wall 2a. This is designed so as to limit the radiation of one of the sources S to a spatial portion around the vertical plane containing the source and the generating line on which are aligned the detectors. For example, the distance between the contact with wall 2a and the source is 100 cm.

Figure 3:
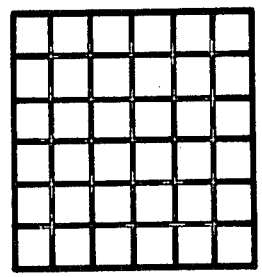
FIG. 3 a sectional view of an embodiment of the colllimator associated with the detector.

A detector $D_1$ is located on the same diameter of the pressurizer. This detector can be a sodium iodide scintillator and is also positioned in a shield 22. Between detector $D_1$ and wall 2a and within the shield 22 there is preferably a collimator 24 formed from metal plates parallel to the incident radiation and whose cross-section can for example be in the form of a grid. This grid is constituted by a system of metal sheets. FIG. 3 more clearly shows a collimator which has, for example a 1 cm spacing. For example, the collimator length along the radiation path is 120 cm.

It is known that $\gamma$ radiation traversing a given material has a certain attenuation level ($\tau$) in a straight line. Thus, by placing a detector in front of the source it is possible to measure the radiation which has traversed the liquid or gas and deduce therefrom the density of said liquid or gas or even the liquid-gas mixture.

By placing the sources and detectors at different levels in the axial direction of the pressurizer, it is consequently possible to make an axial chart of the density of the fluid filling the pressurizer. However, it must be remembered that the radiation must also traverse the metal walls of the pressurizer. The following table gives the average free path for the $\gamma$ radiation as a function of its energy.

TABLE

Average free path for the impact-free flux calculations for 1MeV gammas $\rho H_2O$ liquid = 593.2 kg m$^{-3}$     155 bars
$\rho H_2O$ vapour = 102.4 kg m$^{-3}$     345° C.

| Particles | $\lambda$Iron | $\lambda H_2O$(liquid) | $\lambda H_2O$(vapour) |
|---|---|---|---|
| 1.33 MeV gammas | 2.46 cm | 27.53 cm | 159.47 cm |
| 1.17 MeV gammas | 2.31 cm | 25.76 cm | 149.22 cm |
| 800 MeV gammas | 1.92 cm | 21.45 cm | 124.24 cm |

Considering the special example illustrated by FIG. 2 and the numerical data referred to hereinbefore the following counting rates are obtained:

$\tau_V \simeq 6 \times 10^4 \text{s}^{-1}$ in the vapour phase;

$\tau_L \simeq 90 \text{s}^{-1}$ in the liquid phase for a pressure of 155 bars and a temperature of 345° C. In these calculations, it is considered that the detector $D_1$ faces source $S_1$ and is at the same height.

As stated hereinbefore, it is necessary to take account of the deposited activity corresponding to the deposits of corrosive products on the walls of the pressurizer. However, the grid-like collimation systems shown in FIG. 2 make it possible to minimise the influence of corrosive product deposits. Thus, each elementary emitting surface of the wall only lights up the facing surface of the detector without essentially limiting the radiation from source $S_1$, which is in the form of a beam almost parallel to the detector level.

Under these conditions, the counting rate corresponding to the deposit is low compared with that due to the source.

Account must also be taken of the contribution of the activity of the primary water on the detectors. The corresponding counting rate would be very low for activities of the primary water corresponding to a normal operation of the reactor.

Figure 6:
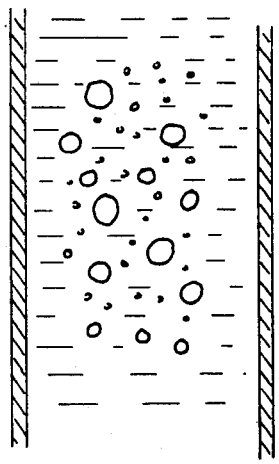
FIG. 6 an example of a two-phase configuration within the pressurizer illustrating one of the advantages of the device according to the invention.

As the detector counting rate is a function of the number of water molecules encountered in a straight line by the radiation, this measured rate gives a picture of the water density level with the detector. This method in particular makes it possible to detect very special two-phase configurations, like those of FIG. 6. In the central part thereof there are vapour bubbles B, whilst the peripheral zone P is entirely constituted by liquid water.

Figure 4:
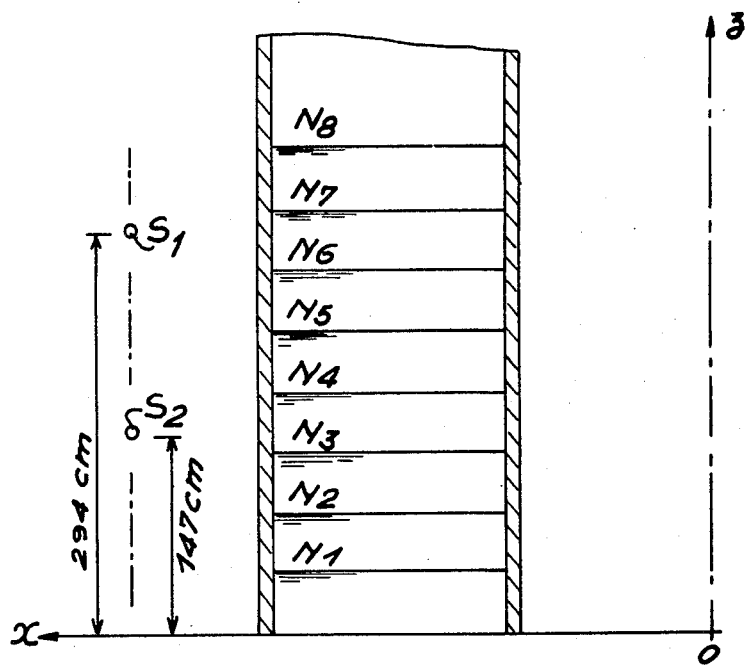

FIGS. 4 and 5 give on the one hand a reference marking of the water levels $N_1$, $N_2 \ldots N_8$ (FIG. 4) with respect to the gamma sources $S_1$ and $S_2$ and on the other hand (FIG. 5) the counting rate $\tau$ (s$^{-1}$) as a function of the reading z (in cm) for the different levels marked 1, 2 ... 8.

To permit the measurement of the water level in the case where its activity is high, one or two detectors are used, which are positioned in such a way that they are not subject to the radiation emitted by the sources. It is therefore possible to correct in the total counting rate that part which is due to the activity of the water.

In practice, problems are encountered in installing a 60 Co source of 1000 curies due to the size of the radiation protection which it requires. It is necessary to use a 21 cm lead container weighing approximately 1 metric tonne. The contact dose is then below 200 mrem/h.

It is therefore of interest to replace the gamma radiation by a neutron beam. It is in particular possible to use a deuterium-tritium source giving neutrons of 14 MeV with an emission of approximately $5.10^{10} s^{-1}$ in a solid angle of $4\pi$.

For a detector with a detection surface area of 160 cm$^2$ and an efficiency of 0.01 the following approximate counting rates would be obtained with a source and a detector on a same diameter, both being positioned 30 cm from the wall:

$\tau \simeq 100 s^{-1}$ in the vapour phase
$\tau \simeq 1.4 \times 10^{-3} s^{-1}$ in the liquid phase
$\tau \simeq 3.6 \times 10^{-2} s^{-1}$ for a two-phase mixture in which $\frac{3}{4}$ of the passages are in the liquid phase.

In this case, a detector suitable for neutron detection is obviously used.

The counts are used as for gamma radiation and it is possible to make an axial "chart" of the densities and consequently of the liquid water-water vapour distributions.

However, it is pointed out that when a neutron source is used, the counting rates indicated hereinbefore show that it is substantially impossible to detect the presence of a small amount of vapour in the liquid.

Thus, the device according to the invention makes it possible to obtain an axial "statement" of the density of the fluid still in the enclosure, so that the liquid level in the enclosure can be calculated with an accuracy dependent on the number of detectors used. It is also apparant that it is possible to overcome the difficulties resulting from the possible activity of the water contained in the enclosure and deposits of corrosive products on the inner wall of the enclosure.

What is claimed is:

1. A device for measuring the surface level of a liquid in a vertically axed enclosure containing a radioactive fluid, the enclosure wall being able to receive deposits of radioactive corrosion products, which comprises N radiation sources located on the same vertical line in the vicinity of the enclosure wall, said sources being able to emit radiation traversing the enclosure; N' radiation detectors $D_1$ (N'>N) located successively at levels on a second vertical line contained in the plane defined by the first vertical line and said axis, said detectors being able to detect the radiation which has traversed the enclosure, each detector measuring the intensity of the radiation received; and means for processing said measurements and deducing therefrom the liquid surface level and/or the local density of the two-phase mixture, wherein it also comprises at least one supplementary detector positioned outside the area reached by the radiation emitted by the sources, said detector being able to measure the radiation due to the radioactivity of the fluid and said deposits.

2. A device according to claim 1, wherein it comprises between the enclosure wall and each of the detectors a collimating device for the radiation which has traversed the enclosure and which is constituted by a system of parallel metal plates, whose function is to reduce the contribution of stray radiation in the vicinity of the detectors to the counting rate of the emitters.

* * * * *